April 14, 1942.  A. E. VOYSEY  2,279,425
DISCHARGE SHUTTER FOR BLOWERS
Filed Nov. 16, 1939  2 Sheets-Sheet 1

INVENTOR
ALFRED E. VOYSEY.
BY
ATTORNEY

Patented Apr. 14, 1942

2,279,425

UNITED STATES PATENT OFFICE 2,279,425

DISCHARGE SHUTTER FOR BLOWERS

Alfred E. Voysey, Prospect Park, Pa., assignor to Westinghouse Electric & Manufacturing Company, East Pittsburgh, Pa., a corporation of Pennsylvania Application November 16, 1939, Serial No. 304,660

6 Claims. (Cl. 230—114)

My invention relates to blowers for forced-draft purposes and the like and it has for an object to provide a shutter for closing the discharge opening upon cessation of operation of the blower and for opening it when the blower is placed in operation.

Where two or more blowers are used to furnish air to a boiler or fire room or to an encased boiler, it is desirable to provide the discharge openings of the blowers with shutters, which operate automatically to open and to close the discharge openings so that, when a blower is shut down, its shutter automatically closes, thereby avoiding the escape of air from the region supplied through the idle blower to the atmosphere, and, when the idle blower is again placed in operation, its shutter automatically opens. In accordance with the present invention, the blower discharge opening is opened and closed by means of a shutter including a group of pivoted vanes, which, in closed position, are arranged so that the leading edge of one of the outer vanes of the group fits closely with respect to the adjacent side of the discharge opening and the trailing edges of the vanes overlap to a slight extent the leading edges of the remaining vanes and the opposite side of the discharge opening. The vanes are constructed and arranged to close automatically upon cessation of operation of the blower and to open automatically when the latter is placed in operation. The vanes are interconnected by mechanism to assure of simultaneous movement thereof in the same direction and to the same extent, and biasing means is preferably associated with the interconnecting mechanism to assure of force being exerted on the vanes in a closing direction when the latter are nearly closed and are closed and for exerting force on the vanes in an opening direction in all other positions of the vanes. Preferably, the vanes are each of foil design or section having a rounded blunt nose or leading edge and tapering to a thin trailing edge and they are pivoted about axes sufficiently near to the rounded leading edges that the lift effect exerted by the air on the backs of the vanes tends to open them. A foil section minimizes losses due to air passing through the shutter and gives a definite lift coefficient so that, as the flow increases, the lift tends to further open the vanes. Accordingly, a further object of the invention is to provide apparatus having these advantageous features of construction and of operation.

A further object of my invention is to provide, in connection with a blower having a substantially rectangular discharge opening, a shutter including a frame for attachment in alined relation with the discharge opening and carrying pivoted vanes for opening and closing the discharge opening, the vanes being interconnected by mechanism to assure of simultaneous movement thereof in the same direction and to the same extent and biasing means being associated with the interconnecting mechanism to provide for the vanes having force exerted thereon holding them in closed position when the blower is shut down.

These and other objects are effected by my invention as will be apparent from the following description and claims taken in accordance with the accompanying drawings, forming a part of this application, in which:

Figures 1, 4:
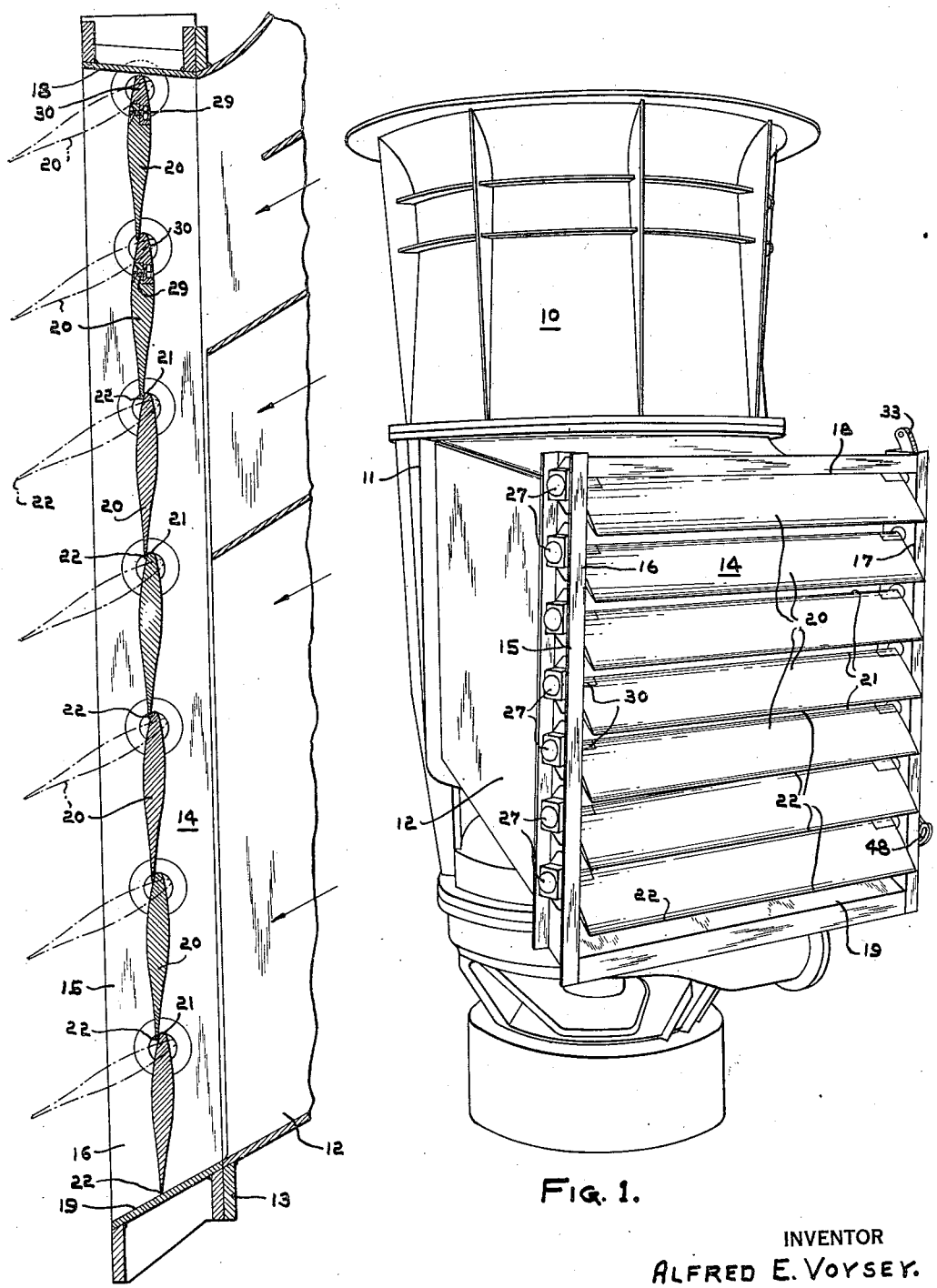
Fig. 1 is an isometric view of a blower having my improved shutter applied thereto.
Fig. 4 is a sectional view taken along the line IV—IV of Fig. 3.

Referring to the drawings more in detail, there is shown a blower, at 10, whose casing 11 has a discharge duct 12 providing, preferably, a rectangular discharge opening bounded by a flange 13. The improved shutter construction, at 14, for the discharge opening is fastened to the flange.

The shutter construction includes a rectangular frame 15 including a first pair of opposed side members 16 and 17 and a second pair of opposed side members 18 and 19. As shown, the blower is of the vertical type and the frame is disposed with the side members 16 and 17 in upright or vertical position and the members 18 and 19 horizontal.

A group of vanes 20, each having leading and trailing edges 21 and 22, are arranged parallel to the second pair of opposed, or top and bottom, members 18 and 19 and they are pivotally carried by the first pair of opposed, or side members 16 and 17, the vanes 20 being arranged so that, in closed position, the top or leading edge 21 of the uppermost vane fits closely with respect to the top member 18 and, at the downstream side of the shutter, the bottom or trailing edges 22 of the vanes overlap slightly the leading or top edges of the remaining vanes and the bottom member 19.

The vanes 20 have short and long trunnions 23 and 24 extending from opposite ends thereof through the vertical side members 16 and 17, respectively, and are supported by bearings 25 and 26 carried by housings 27 and 28 attached to the side members 16 and 17, respectively. Preferably the trunnions 23 and 24 are detachably connected to the vanes by means of screws 29, the trunnions having portions 30 conforming to the vane section.

The trunnions 24 extend beyond the bearings 26 and the housings 28 to provide for interconnection of the vanes by any suitable mechanism, at 32, so that the vanes move simultaneously and to the same extent in the same direction. Preferably, the mechanism, at 32, comprises levers 33 connected to the trunnions 24 and joined by a link 35.

With pivoting of the vanes at or near to their upper or leading edges 21, it will be apparent that they tend to close gravitationally; and, as the lower or trailing edges 22 slightly overlap the bottom member 19 and the leading edges 21 of the vanes, except the leading edge of the uppermost vane, at the discharge of the shutter (Fig. 4), when the blower is placed in operation, the air impact moment acting on each vane opens the vanes, being assisted by the moment due to the low-pressure area at the back of each blade provided that the trunnions are at or near to the leading edge.

While the vanes have gravitational bias tending to close them when the blower is shut down, I prefer to utilize biasing or spring means of the "snap-over" type for exerting closing force on the vanes when the latter are in closed position, thereby avoiding any possible fluttering action of the vanes and consequent leakage of air. Preferably, the biasing or spring means comprises a spring 36 having its upper end attached to a threaded stem 37 passing through an opening 38 provided in the bracket 39 secured to the link 35, the opening 38 having a spherical socket at its upper side for reception of the spherical bearing member 40 carried by the stem 37 and held in adjusted position by means of the nuts 41 and 42. The lower end of the spring is attached to a fixed support 43 provided, for example, by an extension 44 secured to the trunnion 24 of the lowermost vane.

Figure 2:
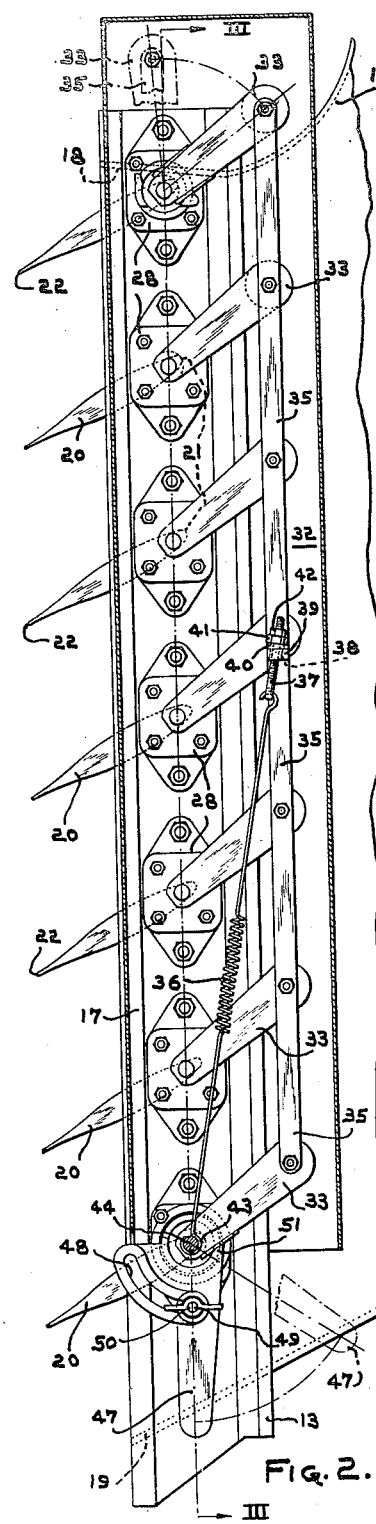
Fig. 2 is a side elevational view of the shutter and the adjacent portion of the blower taken along the line II—II of Fig. 3.
Figure 3:
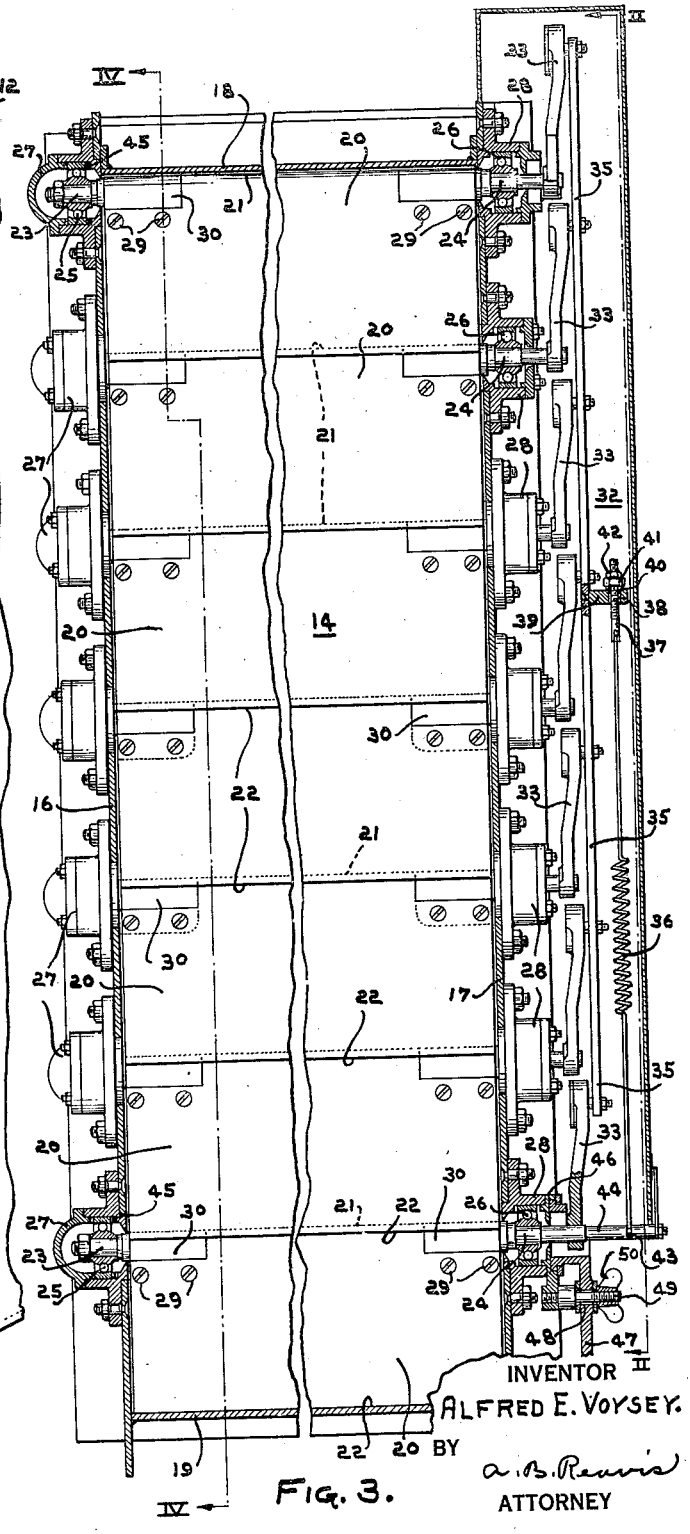
Fig. 3 is a sectional view taken along the line III—III of Fig. 2.

As may be seen from Fig. 2, the levers 33 and the link 35 are necessarily spaced a suitable distance, at the upstream side, from the plane of the vane axes and the levers 33 have such angular relation with respect to the vanes that, as the vanes approach the closed position, shown in Fig. 4, the center of the spherical bearing 40 and the spring 36 come to dead center relation with respect to the fixed support 43 and movement therebeyond in a closing direction renders the spring effective to exert closing force on the vanes.

On the other hand, as the vanes are opened due to blower pressure exerted thereon, opening movement takes place against the force of the spring tending to keep the vanes closed until dead center position is reached; and, immediately as the dead center position is passed, the spring force becomes effective to tend to open the vanes. Thus, aside from the spring means being advantageous to keep the vanes tightly closed when the blower is shut down, it is useful in securing proper opening thereof for the reason that opening movement is initiated by pressure developed by the blower, this pressure, when sufficient, giving an impulsive movement to the vanes sufficient to open the latter beyond the dead center position of the spring, whereupon the force of the spring assists the pressure and the velocity effect of air in opening the vanes to the maximum extent.

As the vanes are held in open position against gravity by the flow or velocity effect of air, I prefer to use vanes of foil section, for example, symmetrical foil section, with rounded or blunt inlet edges 21 and tapering to relatively thin trailing edges 22, such a section utilizing the velocity of flow of air to good advantage in moving to open position. A foil section is used for two reasons: first, to minimize losses due to air passing through the shutter; and, second, to provide a section having a definite lift coefficient in order that, as the flow of air increases, the lift produced by the vanes will tend to further open them. While vanes of symmetrical foil section are shown, they need not be "symmetrical" to achieve these purposes and it is to be understood that the term "foil" when used herein without limitation has the significance of any airfoil or icthyoidal section capable of achieving the purposes desired.

Due to the poor attack angle of the air impinging on the foils, low-pressure areas are developed at the backs of the latter and the moments due thereto may oppose or assist opening thereof by the air depending upon location of the trunnions. If the trunnions of a vane are located coaxial with the section center of gravity axis, the low-pressure area will produce a closing moment opposing the opening moment due to air impact. By arranging the trunnions at or near to the leading edge, the moment due to the low-pressure area may be changed from a closing one to an opening one and assist, instead of oppose, the opening moment due to impact, with the result that, for the same spring tension and lever and link arrangement, the foils open to an equilibrium position which is substantially wider.

When a blower is shut down, its shutter should close the discharge opening as completely as possible consistent with rational manufacturing procedure and mechanical and operating conditions. The close spacing of the leading edge 21 of the top vane with respect to the top member 18 and the overlapping relation of the edges of the vanes with respect to the leading edges of the remaining vanes and the bottom member 19 assures of a fairly close and tight relation of the vanes with respect to the bottom and top members and to one another. The ends of the vanes adjacent to the trunnions 23 are spaced fairly closely with respect to the side member 16, shims 45 between the bearing housing 27 and the bearing 25 assuring of this result. The bearings 26 are arranged for slight axial movement in their housings 28, whereby relative adjustment of the bearings 26 may be secured to avoid any binding action and to accommodate for expansion and contraction of parts lengthwise.

It is desirable to provide means associated with the interconnecting mechanism, at 32, to hold the vanes positively in closed position. To the end, the lowermost bearing housing 28 carries a bracket 46 which pivotally supports the lever 47, the lever having an arcuate slot 48 through which extends the threaded stem 49 carried by the bracket, a binding nut 50 cooperating with the stem to lock the lever with the vanes closed, the lever 48 having an abutment 51 for engagement with the lower lever 33.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a blower having a casing provided with a discharge opening, a group of vanes for opening and closing the discharge opening; said group of vanes, when in closed position, having the leading edge of a first outside vane and the trailing edge of a second outside vane spaced close to opposed sides of the discharge opening and, except for said second outside vane, having their trailing edges overlapping the leading edges of adjacent vanes at the downstream side of the group; means for pivotally supporting the vanes from the casing so that they are biased in a closing direction upon cessation of blower pressure and are opened in response to development of blower pressure; a spring for exerting force on the vanes in opening and closing directions; and means providing for said spring exerting its force on the vanes in a closing direction when the latter are nearly closed and are closed and for exerting its force thereon in an opening direction in all other positions thereof.

2. The combination with a blower having a casing provided with a discharge opening, of a shutter for the discharge opening: said shutter including a frame connected to the casing and having first and second pairs of opposed sides bounding the discharge opening; a plurality of parallel vanes for opening and closing the discharge opening, said vanes when in closed position, having a leading edge of a first vane closely spaced with respect to one side of a first pair of opposed sides of the frame and having their trailing edges overlapping, at the downstream side of the shutter, the other side of the first pair of opposed sides and the leading edges of the vanes except for said first vane; trunnions extending from the ends of each vane and through openings in the second pair of opposed frame sides; trunnion bearings carried by the second pair of opposed frame sides and positioning the vanes longitudinally; said trunnions extending beyond the bearings at one side of the frame; levers connected to the trunnion extensions; a link connecting the levers; and a tension spring having one end connected to the link and the other end connected to a fixed support; said levers having such angular relation with respect to the vanes and said fixed connection for one end of the spring having such position with respect to the connection on the link for the other end of the spring that the dead center position of the connections and of the spring occurs when the vanes are nearly closed in order that the force of the spring may be exerted in a closing direction on the vanes when the latter are closed.

3. The combination as claimed in claim 2 with means providing for axial movement of the bearings carried by the frame side adjacent to the trunnion extensions and means for adjusting axially the bearings carried by the opposed frame side.

4. The combination with a blower having a casing provided with a discharge opening, of a shutter for the discharge opening; said shutter including a frame connected to the casing and having first and second pairs of opposed sides bounding the discharge opening; a plurality of parallel vanes for opening and closing the discharge opening; each of said vanes being of symmetrical foil section with a rounded or blunt nose leading edge and tapering to a thin trailing edge and said vanes, when in closed position, having a leading edge of a first vane closely spaced with respect to one side of a first pair of opposed sides of the frame and having their trailing edges overlapping, at the downstream side of the shutter, the other side of the first pair of opposed sides and the leading edges of the vanes except for said first vane; trunnions extending from the ends of each vane and through openings in the second pair of opposed frame sides; the axis of the trunnions of each vane being located near to the leading edge thereof; trunnion bearings carried by the second pair of opposed frame sides for supporting the vanes and for positioning the latter axially; said trunnions, at one side of the frame, extending beyond the bearings; mechanism for interconnecting the vanes for simultaneous movement in like directions to the same extent and including levers joined to the extensions and connected by a link; and spring means acting on the link to exert closing force on the vanes when the latter are nearly closed and are closed.

5. In a blower having a casing provided with a discharge opening, a shutter for opening and closing the discharge opening and comprising a plurality of vanes which overlap when in closed position; each of said vanes being of foil section having a leading edge and tapering to a thin trailing edge; means for pivotally supporting the vanes from the casing; the axis of the pivotal means for each vane being arranged adjacent to the leading edge thereof so that, when the blower is placed in operation, the vane may open due to the impact moment of air acting on the front face thereof and to the moment due to the low-pressure area at the back face thereof; and means for exerting biasing force on the vanes in a closing direction when the latter are closed or nearly closed.

6. In a blower having a casing provided with a discharge opening, a shutter for opening and closing the discharge opening and comprising a plurality of vanes which overlap when in closed position; each of said vanes being of foil section having a leading edge and tapering to a thin trailing edge; means for pivotally supporting the vanes from the casing; the axis of the pivotal means for each vane being arranged adjacent to the leading edge thereof so that, when the blower is placed in operation, the vane may open due to the impact moment of air acting on the front face thereof and to the moment due to the low-pressure area at the back face thereof; and means for exerting biasing force on the vanes in a closing direction when the latter are closed or nearly closed and in an opening direction in other positions thereof.

ALFRED E. VOYSEY.